Aug. 23, 1955  R. GENEST  2,715,784
PSYCHOLOGICAL TESTS TAKING DESK
Filed July 21, 1952  2 Sheets-Sheet 1
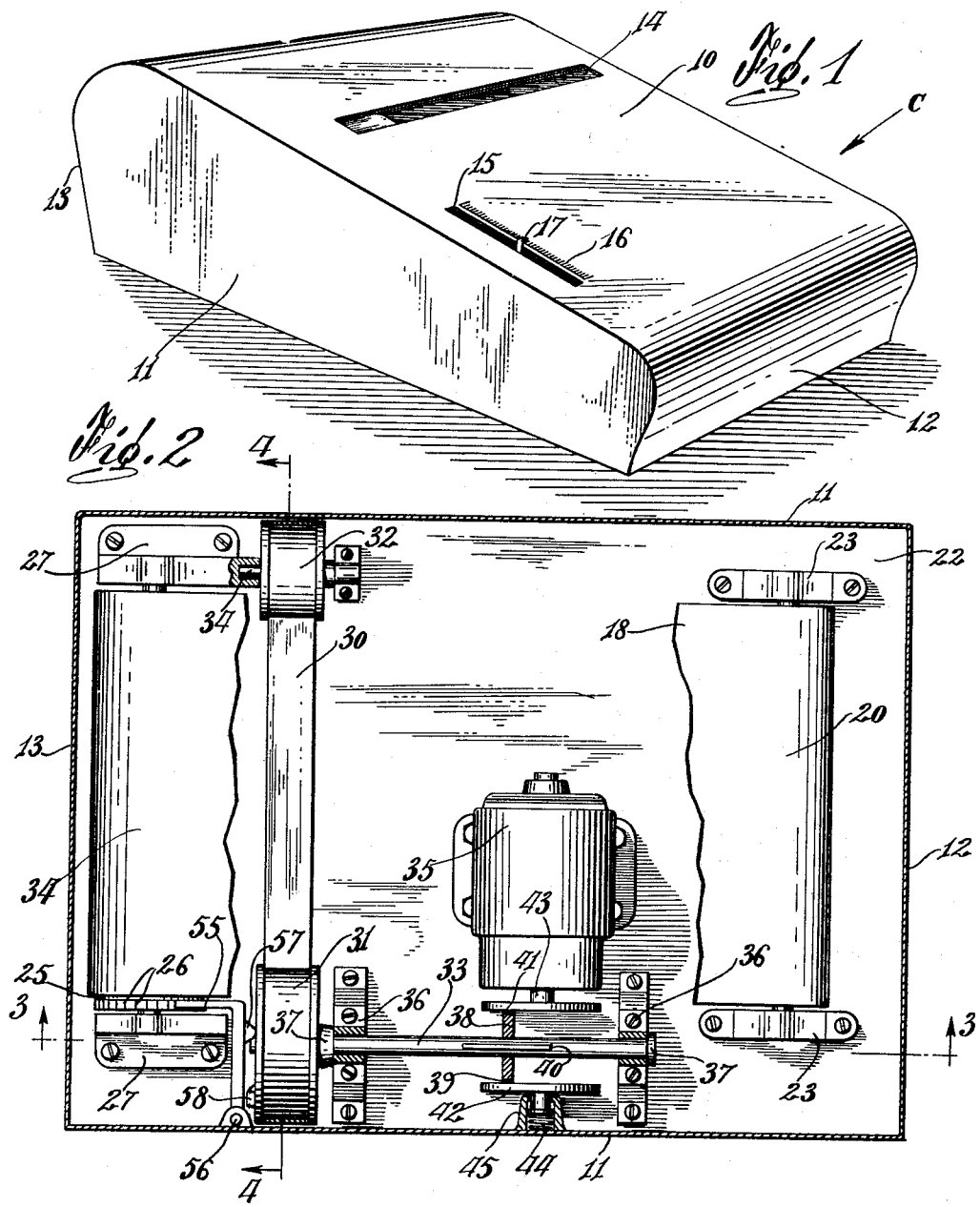
Inventor
Robert Genest
Attorneys Aug. 23, 1955                R. GENEST                2,715,784
                     PSYCHOLOGICAL TESTS TAKING DESK
Filed July 21, 1952                                2 Sheets-Sheet 2
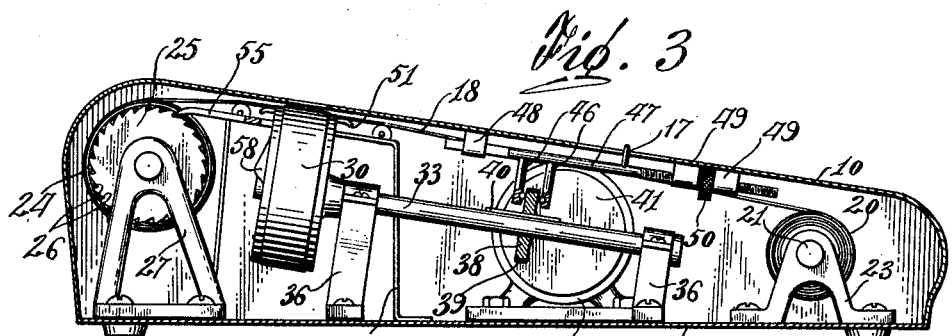
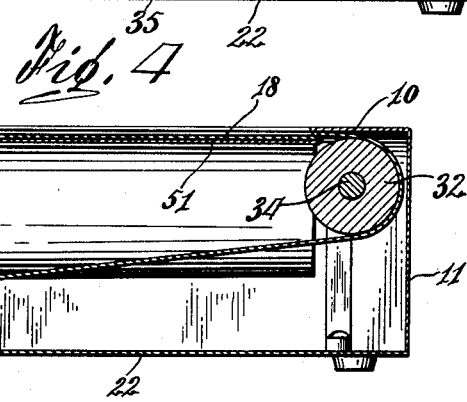
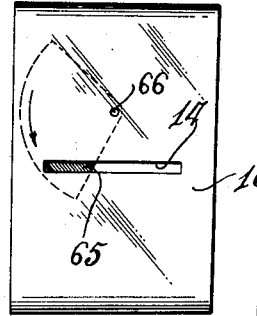
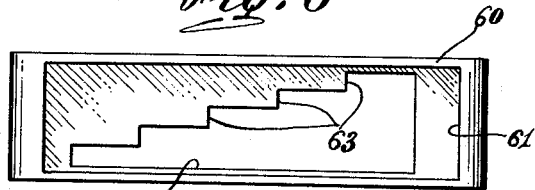
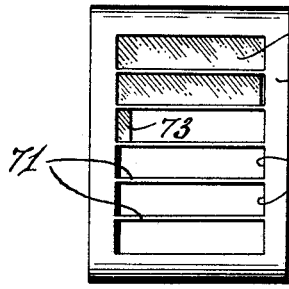
Inventor
Robert Genest
Attorneys

United States Patent Office 2,715,784
Patented Aug. 23, 1955

2,715,784

PSYCHOLOGICAL TESTS TAKING DESK

Robert Genest, Montreal, Quebec, Canada

Application July 21, 1952, Serial No. 300,077

5 Claims. (Cl. 35—22)

The present invention relates to mental and psychological test devices and, more particularly, such a device for taking so-called affectivity tests, wherein an association of ideas is required to be known from an inductor term.

Such affectivity tests require an answer to be given rapidly, after an inductor term has been shown, or flashed, to an applicant, the time factor being short and required to be known within accurate, narrow limits.

Since the tests in question are generally answered in written form, and chronometrically timed, it has been the general practice to issue partly-printed forms to applicants who, from a given signal, are allowed a certain time for writing their answers, after which the forms are collected and tabulated.

Obviously, such a system requires the presence of at least one attendant and entails a loss of time spent for distribution of each individual test sheet. Furthermore, and probably the most important factor, the presence of an attendant has a marked influence on the mental relaxation of subjects undertaking tests: this is even more important with mentally diseased persons, backward children and other psycho cases where strangers may be a distracting factor and a deterrent to clear and quick answers indicating the true mental capacity of said subjects.

The present invention has been conceived as an improvement over the testing methods heretofore practiced and, as such, the concept thereof is based on the provision of a simple mechanism including writing space gradually being screened, or masked, in accordance with a carefully predetermined time-table. Thus, the subject under test is automatically given a definite time for answering specific questions, the said subject being constantly aware of the progress of the time allotted to him.

More specifically, the mechanism conceived may be in the form of a light, easily transported casing or desk having suitable openings on the top thereof for allowing writing, on a paper sheet below said openings, of answers corresponding to definite questions. The openings are adapted to be closed, marked, screened or otherwise obturated by a suitable clockwork so that, after a certain period has elapsed, the openings are closed and no longer apt to permit further writing on the paper sheet.

Consequently, the presence of an attendant is not necessary and, of course, the time element of psychological tests can be accurately determined and made dependable for all tests without errors, time-taking and cheating possibilities.

Consequently, the main object of the invention resides in the provision of an improved device of the character described which is quite efficient for the purpose in view.

Another object of the invention is the provision of a desk casing carrying writing material in sheet form, the availability of the sheet for writing purposes being accurately controlled on a time basis.

A further object contemplates a desk and mechanism whereby psychological written tests can be conducted in groups, with an accurately controlled time factor applicable to each test of a group, without the attendance of monitors, time-keepers or other individuals.

Still another object of the invention envisages means of the character noted which are mechanically simple, foolproof, rugged and relatively inexpensive.

Other objects and advantages of the invention will become apparent, or be pointed out further, during the description to follow.

As an example, and for purposes of illustration only, several possible embodiments are shown in the annexed drawings, wherein:

Figure 1 is a perspective view of a preferred form of the invention, shown in the form of a small, desk-like casing;

Figure 2 is a top inside view of the casing, with parts broken away to show the driving clockwork;

Figure 3 is a vertical section through the casing taken on line 3—3 of Figure 2;

Figure 4 is another vertical section but taken transversely of the casing on line 4—4 of Figure 2;

Figure 5 is a perspective view of the casing opening obturating belt;

Figure 6 is a perspective view of a modified form of the belt of Figure 5;

Figure 7 is a plan view of a modified casing according to the invention, wherein a rotating sector is used for obturating the casing opening, and;

Figure 8 is a plan view of yet another modification.

Referring to the drawings, wherein similar reference characters represent corresponding parts throughout, the letter C indicates generally a portable casing, in the form of a desk having a sloping top surface 10, said casing being closed by means of side walls 11, front and rear walls 12 and 13 respectively. The top surface is provided with at least one elongated narrow transverse opening 14 through which a person taking a test is adapted to write on a paper sheet positioned immediately below. Finally, in the form of the invention shown in Figures 1–4, a slot 15 is formed in the top surface in the left margin thereof, underneath the opening 14. Said slot carries a graduation 16 on one side thereof and an index pointer 17 is displaceable in said slot over the graduation marks. The purpose of this pointer will be explained later on.

As stated previously, the test answers generally are written in upon suitable sheets; according to the present invention the sheet material is in the form of a paper strip wound on rolls and adapted to be unwound as the test progresses and the spaces for answers filled in.

The blank roll 20 is disposed inside the casing, near the front wall thereof and supported freely on the shaft 21 mounted off the casing floor 22 by means of brackets 23.

From the shaft 21, the paper is unrolled and adapted to be wound as a roll 24 over a drum 25 provided with ratchet teeth 26 (see Figures 3–4). This drum is journalled in the brackets 27 secured to the floor 22 at the rear end of the casing. This, the paper strip is adapted to be unrolled from 20 and wound over 25 as it passes underneath the opening 14.

Of course, this unrolling movement of the strip is not continuous but is effectuated by steps, so that a certain portion of the sheet 18, exposed through the opening 14, remains in place a length of time calculated to permit a given number of answers written down within a predetermined time.

During the time the strip remains stationary, however, masking means are operable gradually to cover the said strip so that, after the given time has elapsed, said strip is completely covered and no longer available for writing purposes. Thus, an applicant is only given a definite time for answering, corresponding to the period when the sheet is uncovered.

The covering means may be of various sorts, as shown in Figures 5 to 8. In the embodiment of Figures 1–4, the belt of Figure 5 is used as a masking medium.

Said belt 30 is trained over the pulleys 31 and 32 and driven transversely of the casing by means of the pulley 31 secured over the driving shaft 33, while the pulley 32 is loosely mounted over the stub shaft 34. The driving shaft is actuated by a constant-speed motor 35 which, in the present instance, is a synchronous electric motor although, obviously, said motor could be replaced equally well by spring-wound clockwork, if desirable.

Said driving shaft is journalled in the bearings 36, in parallel relation to the desk top 10, collars 37 being provided to prevent longitudinal movement of the shaft with respect to the bearings. Slidably and longitudinally mounted on the shaft is a disk 38 provided with a peripheral friction lining 39, relative rotational movement of the disk over the shaft being prevented by a key 40. Thus, the disk is free to slide longitudinally over the shaft while being driven thereby.

The sliding disk above is part of a speed transmission including a pair of plates 41—42, between which the disk is right-angularly disposed, and means for displacing the disk therebetween towards, or away from, the plate's center. The plate 41 is the driving one and is secured to the motor shaft 43; the other plate 42 is free and is pressed against the disk by means of a spring 44 disposed in a sleeve 45 of the side wall 11 (see Figure 2). Displacement of the disk is effectuated by the ball-bearing fork 46 projecting from the adjusting rod 47 to straddle the disk, sidewise. The rod 47 is slidably movable in the blocks 48—49, its position therein and, hence, the position of the fork and relation of the disk between the plates, adjustable by means of the nut 50 screwed over the threaded portion 51 of the rod and held against side movement by the close blocks 49 (see Figure 3). The pointer 17 attached to the rod and, in conjunction with the graduation 16, is an indicator of the position of the fork 46 and indirectly, the rotational speed of the disk 38.

This last statement is substantiated by the fact that, as disk 38 is displaced away from the center of driving plate 41, the angular, or linear, speed of the plate at its point of contact with the disk becomes greater and, hence, the rotational speed thereof increases. Under such circumstances, therefore, the speed of the belt 30 wil lbe similarly altered.

As shown to advantage in Figure 5 the belt 30 is formed with a window 50 cut longitudinally for approximately half the belt length, the width of the window corresponding to the size of the opening 14 so that, when 50 and 14 are in register, no impediment should exist to the free and unimpeded writing-in of answers on the sheet 18 disposed immediately beneath the belt 30. For proper support of the sheet 18, in the writing area thereof, a supporting apron 51 is mounted underneath the sheet, below the opening 14, said apron held in place in any suitable manner from the sides 11 or on the floor 22.

The mechanism described so far is operative to move the window of a belt under a given opening and above a sheet of writing paper: as the belt travels across the paper strip the available writing space will gradually decrease until, eventually, the opening is effectively masked and no further writing can be made. As explained, also, the speed of travel of the belt in question is variable at will, thereby varying the time period during which the belt window will be underneath the opening.

After the opening 14 has been completely covered, or masked, there will elapse a certain period of time before it again starts to be uncovered; during this period the sheet underneath is advanced a given amount for presenting, a fresh writing surface on the sheet 18. The mechanism for this advancement is shown in Figures 2 and 3 and includes a pawl 55 engaging the ratchet teeth 26, said pawl being pivoted at 56 on the side wall 11 (Figure 2). A nose 57 on said pawl is adapted to be contacted by the cam 58 on the pulley 51, once every revolution of said pulley, the positioning of both nose and cam being calculated to cause activation of the pawl while the opening 14 is masked. As shown in Figure 3, the pawl is normally retracted by means of a flat spring 59.

Summing up, therefore, the explanations above, the device of the invention is a closed casing having a top opening and a sheet of paper underneath said opening. A constantly movable belt having an elongated window is disposed immediately below the opening and between said opening and the paper sheet. The window is disposed to register with the opening and, consequently, as the belt moves on, the window will occupy a position over the sheet from a completely uncovered opening to a completely closed opening. A variable speed transmission is provided to change at will the speed of travel of the belt.

A step-by-step sheet advancing mechanism is also provided for displacing the sheet gradually, said sheet being in the form of a paper strip rolled on a loose roller and adapted to be wound onto a ratchet-operated roll.

A modification of this basic mechanism is shown in Figure 6, wherein a belt 60 is provided with more than one window. Said belt 60 is considerably wider than the belt 30 and carries a rectangular window 61 and a smaller, stepped window 62 having a series of steps 63. When such a belt is used with a casing having a wide opening (corresponding to the width of window 61) a large area of the sheet 18 may be available for specific purposes, such as drawings or, conversely, the stepped opening may conveniently mask lines of writing on the sheet in successive steps. Obviously, when such a belt is used, the width of the pulleys 31—32 must be adjusted correspondingly.

In the modification of Figure 7, the belt 30 is replaced by a rotating sector 65 adapted to mask progressively the opening 14. Said sector may conveniently be pivoted at 66 and actuated by any suitable means, such as a gear attached to the sector and meshing with a pinion replacing pulley 31, in which case the belt 30 and pulley 32 would be dispensed with.

The form of the invention shown in Figure 8 comprises a plurality of openings 70, each separated from the next by a narrow land 71. This form is adapted to display a number of openings, each being successively masked, starting from the top. The kind of belt 72 useful for this form would appear somewhat like belt 60 of Figure 6, except that the rectangular opening 61 would be omitted and the overall width greatly increased. The steps 73 of such a belt 72 would have to be spaced somewhat like the steps 63 of belt 60 (Figure 6). Obviously, the same remarks apply for this form respecting the width of the pulleys 31—32.

From the foregoing, it must be evident that the present invention is a useful advance in the art of psychological tests devices; according to this invention a small, light, closed, portable desk is provided in which a paper strip carrying questions mounted to be progressively unrolled from one roll to another. The desk is designed to display the questions or other data through an opening which is gradually being closed or masked. Therefore, the applicant is given a definite, predetermined period of time for answering and, of course, he is aware of the progress of this time period by the slowly advancing means masking the displayed questions or data.

This is an important factor in the hands of a busy psychologist who, by a simple adjustment of a knurled nut (numbered 50 in the drawings), can change at will the period of time allotted for answering. Obviously, this adjustment is not available to the applicant who, consequently, does not have to be watched or monitored. The psychologist, therefore, is always certain that the answers written on the paper strip inside the desk were given within the predetermined time he had allotted.

An advantage of the invention, in the case of difficult mental cases, resides in the fact that a desk can be given to a subject, who can be left alone with it, without the mental inhibition inherent to the presence of attendants and strangers.

Finally, due to the fact that a relatively long strip of paper can be loaded in a desk, a complete test can be carried out without having to distribute, collect and tabulate a large number of separate, loose sheets. With the said desk, all the answers are found together for easy and accurate tabulation.

It must be understood that various changes as to the shape, size and arrangement of parts may be resorted to without departing from the spirit of the invention or the scope of the subjoined claims.

What I claim is:

1. As a portable desk for psychological tests, an otherwise closed casing having an opening in the top surface thereof, a strip of writing paper disposed to be unrolled underneath said opening and be displayed therethrough, a belt movable transversely across the paper strip between said strip and the opening, said belt having a window and being trained over a loose and a driving pulley, a constant-speed prime mover, a variable-speed transmission between the motor and driving pulley for actuating the belt, means for adjusting the transmission speed, and a step-by-step mechanism for advancing the sheet across the opening actuated by said variable-speed transmission.

2. In a desk as claimed in claim 1, a loose roller for carrying a roll of the strip paper, a driven roller for receiving the free end of the strip and pulling same from the loose roller, ratchet teeth on said driven roller, a pawl operable to engage said teeth, and a nose on the driving pulley for operating the pawl.

3. In a desk as claimed in claim 2, a shaft supporting the driving pulley, a key on said shaft, a disk loosely mounted on the shaft but slidable along the key, friction material on the edge of the disk, a plate secured to the prime mover and actuated thereby, the edge of the disk being in contact with the motor plate, and a pressure plate parallel to and opposite the motor plate for urging the disk thereon.

4. In a desk as claimed in claim 3, a fork engaging the disk, sidewise, a rod supporting said fork, blocks for slidably securing the rod, means for adjustably sliding the rod in the blocks, and a pointer and scale for indicating the position of the rod.

5. In a desk as claimed in claim 1, wherein the window of said belt has a series of steps on one side thereof.

References Cited in the file of this patent

UNITED STATES PATENTS

| | | |
|---|---|---|
| 666,906 | Pierpoint | Jan. 29, 1901 |
| 1,618,359 | Vitolo | Feb. 22, 1927 |
| 2,211,868 | Steeneck | Aug. 20, 1940 |
| 2,359,460 | Barens | Oct. 3, 1944 |